(No Model.)
M. B. JACOBY & H. R. LUYTIES.
HORSE DETACHER.
No. 395,235. Patented Dec. 25, 1888.
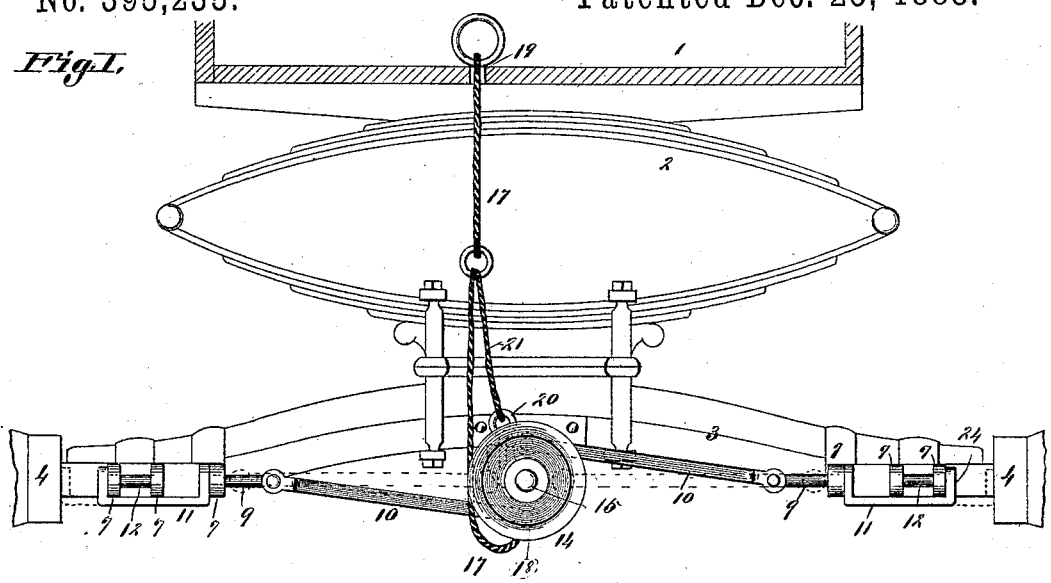
Fig. I.
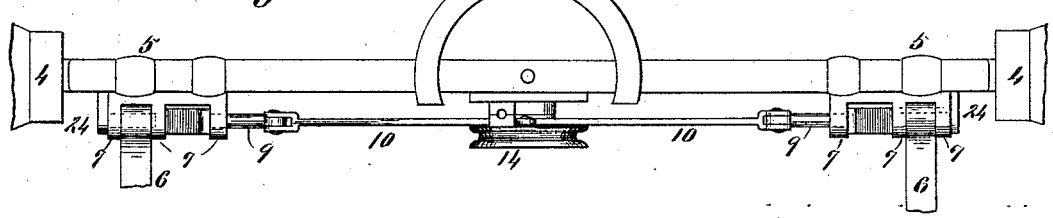
Fig. II.
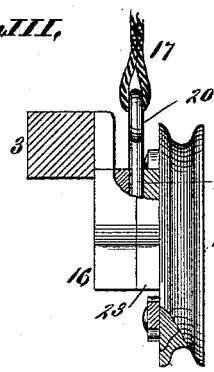
Fig. III.
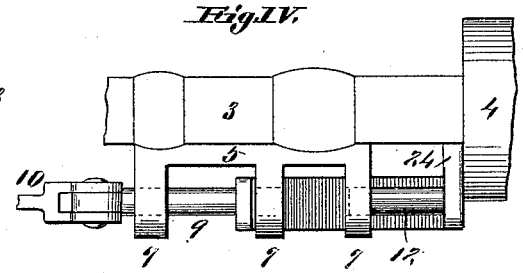
Fig. IV.
Attest:
F. A. Hopkins
Samuel H. Knight
Inventor;
Max B. Jacoby
Henry R. Luyties
By Knight Bros
attys

UNITED STATES PATENT OFFICE.

MAX B. JACOBY AND HENRY R. LUYTIES, OF ST. LOUIS, MISSOURI, ASSIGNORS TO SAID LUYTIES, AARON STRAUS, AND DAVID WASSERMAN, OF SAME PLACE.

HORSE-DETACHER.

SPECIFICATION forming part of Letters Patent No. 395,235, dated December 25, 1888.

Application filed August 13, 1888. Serial No. 282,490. (No model.)

*To all whom it may concern:*

Be it known that we, MAX B. JACOBY and HENRY R. LUYTIES, both of the city of St. Louis, in the State of Missouri, have invented a certain new and useful Improvement in Horse-Detachers, of which the following is a full, clear, and exact description, reference being had to the accompanying drawings, forming part of this specification, and in which—

Figure I is a vertical section through a portion of the body of a vehicle, and showing the front axle, spring, part of the wheels, and our improved detacher in elevation. Fig. II is a top view with the body and spring removed. Fig. III is an enlarged vertical section through the axle and part of the detaching mechanism. Fig. IV is an enlarged detail view.

Our invention relates to an improved horse-detacher and brake for vehicles; and our invention consists in features of novelty hereinafter fully described, and pointed out in the claims.

Referring to the drawings, 1 represents part of the body, 2 the front spring, and 3 the axle, of a vehicle.

4 represents the hubs of the front wheels.

5 represents the clips, and 6 the ends of the thills or shafts. The clips are preferably each made with three lugs, 7, between the outer two of which the shafts fit, as shown in Fig. II, the inner ones serving as guides for pins 9, which are secured at their inner ends to links 10 and at their outer ends to U-shaped plates 11. Secured to the outer ends of the plates 11 are pins 12, which, when the plates are in their inner or using position, enter both of the outer lugs of each clip and pass through the eyes of the shafts, as shown in Figs. I and II. These pins serve to connect the shafts to the vehicle. When the plates 11 are forced outward into the position shown in Fig. IV, the pins 12 are moved back out of the space between the two outer lugs 7, and thus the shafts are disconnected. The plates and pins are thus operated by means of the links 10, which are connected to a lever, 14, preferably made in the form of a wheel, as shown. This lever is pivoted at 15 to a bracket, 16, (see Fig. III,) secured to the axle 3, one link 10 being secured to the lever at one side of the pivot and the other link to the lever on the other side of the pivot. The lever is operated or turned by means of a cord or chain, 17, connected to it at 18, and which passes up through a hole or perforation, 19, made in the bottom of the body 1. (See Fig. I.) It will thus be seen that when the shafts are connected and the parts are in the position shown in Figs. I and II, by pulling on the cord 17 the lever and links will be moved from the position shown in full lines, Fig. I, to the position shown in dotted lines, Fig. I, and full lines, Fig. IV, and thus in case of accident the animal can be quickly and easily disconnected from the vehicle by simply pulling upward on the cord or chain 17.

To keep the lever from turning accidentally when the parts are in use, we connect a pin, 20, to the cord or chain 17 my means of a short additional cord or chain, 21, this pin fitting in a recess, 22, made half in the hub 23 of the lever and half in the bracket 16. The cord or chain 21 is taut when the parts are in their using position, so that the first thing done on pulling upward on the cord or chain 17 is to remove the pin 20 out of the recess 22, thus unlocking the lever, and then by a further upward movement of the cord or chain the lever is turned, as described.

To form a brake for the purpose of stopping the vehicle when the animal has been disconnected or detached, we so locate the parts that when the plates 11 are moved outward their ends 24 come against the hubs 4 of the wheels, as shown in Fig. IV, and by a constant pulling on the cord or chain 17 a brake is thus applied to the wheels to stop the vehicle.

We claim as our invention—

1. In a detacher, the combination of the clips, each having three lugs or more, pins 12 for connecting the shafts thereto, pins 9, passing through the innermost lugs, and suitable means for connecting said pins 9 and 12, said pins 12 when disengaged from the shafts being adapted to be pushed outwardly toward the sides of the vehicle, a pivoted lever, links connecting the lever to the pins, and a cord or chain for turning the lever, substantially as set forth.

2. In a detacher, the combination of the clips, pins for connecting the shafts to the clips, sliding plates to which the pins are secured at one end and extend toward the other end, links connected to the plates, pivoted lever, and a cord or chain for turning the lever, substantially as and for the purpose set forth.

3. In a detacher, the combination of the clips, pins connecting the shafts to the clips, sliding plates to which the pins are secured, links connected to the plates, a pivoted lever to which the links are secured, a cord or chain for turning the lever, and a pin connected to the cord or chain which is adapted to lock the lever in using position and to be removed in the act of turning the lever, substantially as and for the purpose set forth.

4. In a detacher, the combination of the clips, pins connecting the shafts to the clips, sliding U-shaped plates extending underneath the ends of the shafts, pins secured to the inner ends of the plates, links connected to the pins, pivoted lever to which the links are secured, and cord or chain for turning the lever, substantially as and for the purpose set forth.

5. In a combined detacher and brake, the combination of the clips, pins for connecting the shafts to the clips, sliding plates to which the pins are secured, and means for moving the plates outwardly to force the pins out of engagement with the shafts, and which forces the ends of the plates against the hubs of the wheels of the vehicle to form a brake, substantially as and for the purpose set forth.

6. In a combined detacher and brake, the combination of the wheels 4, axle 3, clips 5, pins 12, plates 11, pins 9, links 10, lever 14, clip 16, pins 20, and cords or chains 17 and 21, substantially as and for the purpose set forth.

MAX B. JACOBY.
HENRY R. LUYTIES.

In presence of—
EDW. S. KNIGHT,
JOS. WAHLE.